United States Patent [19]

Tachibana et al.

[11] Patent Number: 4,472,030

[45] Date of Patent: Sep. 18, 1984

[54] CESIUM-CONTAINING OPTICAL GLASS

[75] Inventors: Masakiyo Tachibana, Machida; Yukio Noguchi, Inagi; Noboru Akazawa, Sagamihara, all of Japan

[73] Assignee: Nippon Sheet Glass Company, Limited, Osaka, Japan

[21] Appl. No.: 548,787

[22] Filed: Nov. 4, 1983

Related U.S. Application Data

[63] Continuation-in-part of Ser. No. 443,073, Nov. 19, 1982, abandoned, which is a continuation of Ser. No. 210,572, Nov. 26, 1980, abandoned.

[30] Foreign Application Priority Data

Nov. 27, 1979 [JP] Japan ................... 54-152401

[51] Int. Cl.$^3$ ............... C03C 13/00; C03C 3/00
[52] U.S. Cl. ...................... 350/413; 65/3.14; 65/30.13; 65/30.14; 501/37; 501/38; 501/63; 501/64; 501/65; 501/67; 501/69; 501/72; 501/73; 501/74; 501/77; 501/79; 501/903
[58] Field of Search ............ 501/903, 37, 38, 63, 501/64, 65, 67, 69, 72, 73, 74, 77, 79; 65/3.14, 30.13, 30.14; 350/413

[56] References Cited

U.S. PATENT DOCUMENTS

| | | | |
|---|---|---|---|
| 3,827,785 | 8/1974 | Matsushita et al. | 501/37 |
| 3,843,228 | 10/1974 | Yoshiyagawa et al. | 501/37 |
| 4,367,012 | 1/1983 | Ikeda et al. | 501/37 |

FOREIGN PATENT DOCUMENTS

| | | | |
|---|---|---|---|
| 2457085 | 6/1975 | Fed. Rep. of Germany | 65/30.14 |
| 1507834 | 11/1967 | France | 501/64 |
| 50-87106 | 7/1975 | Japan . | |

*Primary Examiner*—Helen M. McCarthy
*Attorney, Agent, or Firm*—Wenderoth, Lind & Ponack

[57] ABSTRACT

A cesium-containing optical glass comprising, by weight, 32-56% of $SiO_2$, 6-25% of $K_2O$, 6-32% of $Cs_2O$, 0-30% of BaO, 0-2.5% of MgO, 5-34% of ZnO, 0-3% of $ZrO_2$ and 0-5% of $SnO_2$, provided that the total proportion of BaO, MgO and ZnO is 8-40% and the total proportion of $ZrO_2$ and $SnO_2$ is 0.2-6%. When this cesium-containing optical glass is treated in a molten bath containing potassium nitrate, the cesium ion in the glass is easily exchanged with a potassium ion and therefore, the cesium ion concentration gradually decreases radially outwardly from the central axis and the potassium ion concentration gradually increases in that direction. Thus, there is obtained a light converge-type lens in which the refractive index gradually decreases in the same direction.

4 Claims, 3 Drawing Figures

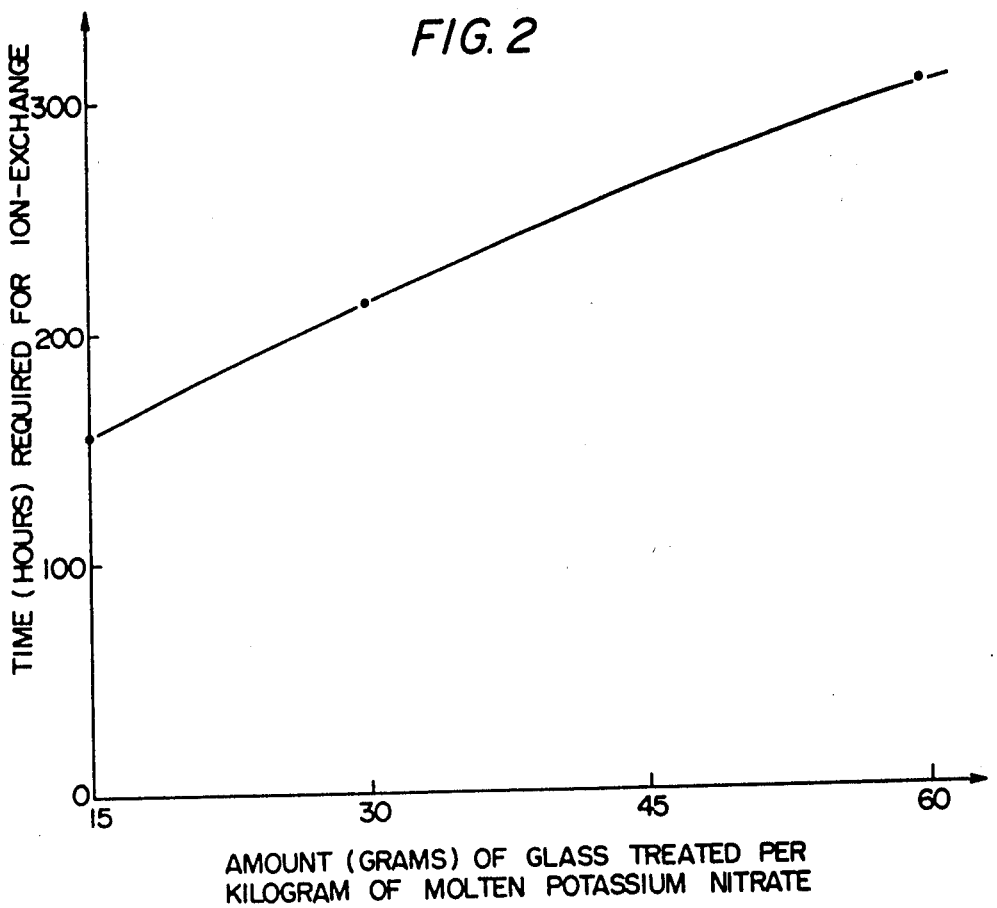

CESIUM-CONTAINING OPTICAL GLASS

CROSS-REFERENCE TO RELATED APPLICATION

This is a Continuation-in-part of application Ser. No. 443,073, filed on Nov. 19, 1982, which is a Continuation of application Ser. No. 210,572, filed on Nov. 26, 1980 both abandoned.

BACKGROUND OF THE INVENTION

This invention relates to a cesium-containing optical glass which is especially suitable for light converging-type lenses.

Cesium-containing optical glass is known from Japanese Patent Publication No. 21594/76 (corresponding to U.S. Pat. No. 3,827,785). This patent document describes a light converging-type lens having the composition of 2-50 mole% $Cs_2O$, 30-98 mole% $SiO_2$ and 0-30 mole% $B_2O_3$, the sum of $SiO_2 + B_2O_3$ being 50-98 mole%, at its central axis, with the concentration of cesium gradually decreasing outwardly from its central axis and the concentration of an alkali metal other than cesium gradually increasing in the same direction. It also states that this light converging-type lens is produced by molding a glass having the above composition at its central axis into a rod, and treating the glass rod in a molten salt containing potassium such as potassium nitrate at a temperature slightly higher (e.g., 560° C.) then the yield point (e.g., 500° C.) of the glass for a long period of, for example 120 hours, thereby exchanging the cesium ion with a potassium ion.

The light converging-type lens so produced, however, has defects in that because of the said ion exchange, the surface of the lens is corroded by the molten salt, its strength is reduced and breakage of the lens occurs during the manufacturing process, or the diameter of the lens becomes nonuniform and the corroded portion of the glass cannot be effectively used as a lens.

There is also known a glass composition suitable for production of a light transmitting glass body, which is composed mainly of $SiO_2$ (35-60 mole%), $B_2O_3$ (30-45 mole%) and $Cs_2O$ (8-25 mole%) and in which the cesium ion is substituted by an alkali metal ion from an external source to provide a refractive index continously decreasing from its center toward its peripheral surface (see Japanese Laid-Open Patent Publication No. 87106/75).

This cesium-containing glass is the same as the glass disclosed in the first-cited prior art reference in that it contains $SiO_2$, $B_2O_3$ and $Cs_2O$.

SUMMARY OF THE INVENTION

It is an object of this invention to provide a cesium-containing optical glass having a novel composition.

Another object of this invention is to provide a cesium-containing optical glass containing cesium and potassium and having a wide vitrifying composition range.

Still another object of this invention is to provide a cesium-containing optical glass having resistance to a molten alkali metal salt, which is suitable for producing a light converging-type lens containing cesium in a gradually decreasing concentration outwardly from its central axis and an alkali metal other than cesium, particularly potassium, in a gradually increasing concentration in that direction by treating the aforesaid optical glass in a molten alkali metal salt, especially molten potassium nitrate.

BRIEF DESCRIPTION OF THE DRAWINGS

FIG. 2 is a graph which depicts the amount of glass in respect to the amount of molten potassium nitrate plotted against the time of treatment.

DETAILED DESCRIPTION OF THE INVENTION

Figure 1:
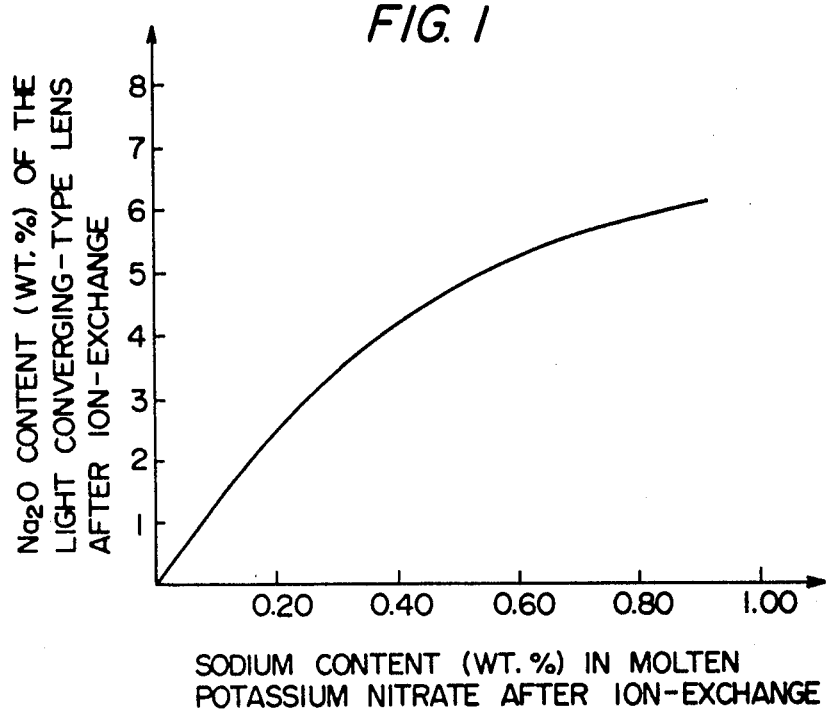
FIG. 1 of the drawings shows a graph depicting an ion-exchange reaction in which various glass lenses or glass rods were immersed in a molten bath containing potassium nitrate.

Other objects of this invention will become apparent from the following description.

According to this invention, these objects and advantages are achieved by a cesium-containing optical glass comprising $SiO_2$, $K_2O$, $Cs_2O$, $ZnO$, at least one compound selected from the group consisting of $ZrO_2$ and $SnO_2$ in the following proportions in percent by weight:

| | |
|---|---|
| $SiO_2$ | 32-56, |
| $K_2O$ | 6-25, |
| $Cs_2O$ | 6-32 |
| $ZnO$ | 5-34, |
| $ZrO_2$ | 0-3, |
| $SnO_2$ | 0-5, |
| $BaO$ | 0-30, |
| $MgO$ | 0-2.5, |
| $BaO + MgO + ZnO$ | 8-40, and |
| $ZrO_2 + SnO_2$ | 0.2-6. |

In the above glass composition, $SiO_2$ is used as a glass-forming component, and its proportion should be 32 to 56% by weight, preferably 40 to 56% by weight, based on the weight of the glass. If the proportion of $SiO_2$ is less than the specified lower limit, the durability of the glass decreases, and if it exceeds the upper limit, the required amounts of other constituents cannot be secured, and the objects of this invention cannot be achieved.

$Cs_2O$ is included in a proportion of 6 to 32% by weight. If its proportion is less than the specified lower limit, a refractive index distribution of practical value cannot be obtained. If it exceeds the upper limit, the durability of the glass is reduced. The preferred proportion of $Cs_2O$ is 10 to 20% by weight.

$K_2O$ is included in a proportion of 6 to 25% by weight, preferably 10 to 18% by weight. Inclusion of $K_2O$ in glass generally broadens the vitrifying composition range, and can improve the high temperature viscosity and low temperature viscosity of the glass. The viscosity of glass, which is melted in the molten state, is its high temperature viscosity. The presence of $K_2O$ reduces the high temperature viscosity, and facilitates the melting of the glass. The viscosity of glass at a temperature lower than its melting temperature (i.e., the working temperature to the deformation temperature) is its low temperature viscosity. The presence of $K_2O$ reduces the low temperature viscosity, and makes it possible to increase the rate of ion exchange at a predetermined temperature and to lower the temperature during the ion exchange. Consequently, deterioration of the molten salt and damage of the molten salt treating vessel can be prevented.

If the content of $K_2O$ is less than the above-specified lower limit, vitrification becomes difficult in a high $SiO_2$ content range. If it exceeds the upper limit, the durability of the glass is reduced.

Investigations of the present inventors have shown that a composition containing $Cs_2O$ as the only alkali metal oxide cannot be vitrified, unless it contains at least 40% by weight of $B_2O_3$, not more than 30% by weight of $SiO_2$ and not more than 30% by weight of $Al_2O_3$ as network-forming oxides, and moreover, glass of this composition has poor weatherability. Further, because of the increased $B_2O_3$ content, the $Cs_2O$ and $B_2O_3$ evaporate together and the content of $Cs_2O$ tends to vary.

The glass composition of this invention contains $Cs_2O$ and $K_2O$, and can be vitrified when the $SiO_2$ content is higher than glass of the above composition containing $Cs_2O$ but not $K_2O$.

The glass of this invention further contains not more than 30% by weight of BaO, not more than 2.5% by weight of MgO and 5 to 34% by weight of ZnO so that the total proportion of these oxides is 8 to 40% by weight, preferably 15 to 34% by weight.

If the content of BaO exceeds the specified upper limit, ion exchange does not smoothly proceed, and the resulting lens has a poor refractive index distribution. The preferred proportion of BaO is not more than 5% by weight. If the content of MgO exceeds the specified upper limit, the melting temperature and melt viscosity of the glass become high. If the proportion of ZnO exceeds the specified upper limit, the temperature at the time of ion exchange becomes excessively high, and also the durability of the glass is poor. If the proportion of ZnO is below the specified lower limit, the surface of glass is apt to be corroded in the molten both containing pottasium nitrate. The preferred proportion of ZnO is 5 to 20% by weight.

These oxides, BaO, MgO and ZnO, are used in this invention generally to broaden the vitrifying composition range and increase the solubility of the glass. If the total amount of these oxides is less than the lower specified limit, vitrification becomes difficult. If it exceeds the upper limit, the durability of the glass is reduced. Among these oxides, ZnO is especially preferred because it does not adversely affect the ion exchange reaction.

The glass of this invention also contains at least one compound selected from not more than 3% by weight of $ZrO_2$ and not more than 5% by weight of $SnO_2$ so that the total amount of these is 0.2 to 6% by weight, preferably 0.3 to 5% by weight. If the proportion of $ZrO_2$ is larger than the above limit, insoluble materials tend to form in the glass. The preferred proportion of $ZrO_2$ is not more than 2% by weight. If the proportion of $SnO_2$ exceeds the above-specified limit, devitrification tends to occur, and the glass is liable to undergo coloration. The preferred proportion of $SnO_2$ is not more than 3% by weight. As a result of including such small amounts of $ZrO_2$ and/or $SnO_2$ in the glass of this invention, its resistance to molten alkali metals such as molten potassium nitrate can be markedly improved, and increased weatherability can be imparted to glass obtained after treatment with such a molten alkali metal salt. Specifically, because of the inclusion of $ZrO_2$ and/or $SnO_2$, the surface of the glass of this invention is substantially prevented from the corrosive attack of, for example, potassium nitrate or its decomposition product, when it is treated with a molten salt of potassium nitrate so to cause an exchange between cesium and potassium.

As is clear from the foregoing, the cesium-containing optical glass of this invention exhibits excellent performance by the synergistic effect of the individual components defined by the above composition range, particularly in a light converging-type lens produced therefrom.

Investigations of the present inventors have also shown that in addition to the above constituent components, the cesium-containing optical glass of this invention may also contain the following additional components in the proportions indicated below, and the inclusion of these additional components does not in any way impair the objects of this invention. Accordingly, the present invention also provides a glass which further contains these additional components.

These additional components which the cesium-containing glass of this invention may contain are $B_2O_3$, $Al_2O_3$, $Li_2O$, $Na_2O$, $Ta_2O_5$, $Sb_2O_3$, $Bi_2O_3$, $GeO_2$, CaO, SrO, PbO, $La_2O_3$ and $As_2O_3$ which are included in the glass composition of this invention for certain purposes.

$B_2O_3$ may be included in a proportion of not more than 2% by weight. The presence of $B_2O_3$ facilitates the melting of glass. If it is used in too large an amount, its volatilization causes formation of striae and accelerates volatilization of $Cs_2O$.

$Al_2O_3$ may be included in a proportion of not more than 6% by weight. The presence of $Al_2O_3$ increases the durability of glass. The maximum proportion of alumina is 6% by weight in order not to adversely affect the meltability of glass.

$Li_2O$ and $Na_2O$ may be included in an amount of not more than 2.5% by weight and not more than 4.5% by weight, respectively. These alkali metal oxides may be used to increase the meltability of the glass and adjust its low temperature viscosity. The glass of this invention, however, has sufficient meltability and low temperature viscosity even when it does not contain these additional metal oxides. The maximum total amount of these oxides is 7% by weight in order not to adversely affect the ion exchange between cesium and potassium.

$Ta_2O_5$ may be included in a proportion of not more than 8% by weight. The component is used to facilitate the melting of $ZrO_2$. If its proportion exceeds 8% by weight, melting of the glass becomes difficult.

$Sb_2O_3$, $Bi_2O_3$ and $GeO_2$ may be included in a proportion of not more than 2% by weight, not more than 14% by weight, and not more than 25% by weight, respectively. These oxides are used to adjust the low temperature viscosity of the glass. If the contents of these oxides exceed the respective upper limits, the resulting glass tends to have poor resistance to molten potassium nitrate.

CaO, SrO and PbO may be included each in a proportion of not more than 2.5% by weight provided that the total amount of these does not exceed 2.5% by weight. $La_2O_3$ may be included in a proportion of not more than 2% by weight. If the proportions of these components exceed the above-specified limits, the durability of the glass is reduced.

$As_2O_3$ may be included as a clarifying agent in an amount of up to 1% by weight.

The following examples illustrate the cesium-containing glass of this invention more specifically.

EXAMPLES 1 TO 16 AND COMPARATIVE EXAMPLES 1 TO 4

As the sources of the oxides shown in Table 1, there were used silica powder, lithium carbonate, sodium carbonate, potassium carbonate, cesium nitrate, barium nitrate, zinc oxide, zirconium oxide, tin oxide, calcium carbonate, magnesium carbonate, strontium carbonate, lead oxide, lanthanum oxide, germanium oxide, boric acid, aluminum hydroxide, antimony oxide, bismuth oxide, tantalum oxide and arsenic anhydride which contained the metals included in the oxides of the glass.

Predetermined amounts of these materials were well mixed, and the mixture was put into a platinum crucible and melted at 1300° to 1450° C. in an electrical furnace. The molten mixture was well stirred to homogenize the glass, cast into a mold at 1100° to 1250° C., and annealed to form glasses having the compositions shown in Table 1.

Table 1 also shows the properties of the resulting glasses.

The yield point (°C.) in Table 1 is the critical temperature at the time of ion exchange. It is measured by a method comprising suspending a glass rod having a diameter of 4 mm and a length of 50 mm with one end supported, exerting a load of 10 g on its lower end, heating the glass rod at a rate of 4° C./min., and recording its elongation. The temperature at which the glass rod is broken is the yield point of the glass. Furthermore, at this temperature glass usually has a viscosity of $10^{11}$ to $10^{12}$ poises.

Generally, glass having a high yield point requires a long time for ion exchange, and therefore, to shorten this time, the temperature of the molten salt bath should be increased. Generally, however, when the temperature of the molten salt bath is elevated, decomposition of the molten salt (e.g., $KNO_3$) tends to take place and therefore, the glass and the bath bank will be corroded heavily. Desirably, therefore, the yield point of the glass should be as low as permissible.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Glass composition | $SiO_2$ | 32 | 36 | 34 | 34 | 55 | 45 | 35 | 40 | 40 | 55 |
| | $B_2O_3$ | — | — | — | — | — | 2 | 2 | — | — | — |
| | $Al_2O_3$ | — | 6 | — | — | — | — | — | — | — | — |
| | $Li_2O$ | — | — | — | — | 2.5 | — | — | — | — | — |
| | $Na_2O$ | — | — | — | — | 4.5 | — | — | — | — | — |
| | $K_2O$ | 7 | 6 | 10 | 10 | 17 | 15 | 18 | 16 | 15 | 10 |
| | $Cs_2O$ | 32 | 6 | 20 | 20 | 10 | 20 | 10 | 10 | 10 | 10 |
| | BaO | — | 30 | 13.5 | 13.5 | — | 10 | — | — | — | 13 |
| | ZnO | 24 | 10 | 14 | 14 | 8 | 6 | 34 | 8 | 15 | 5 |
| | $ZrO_2$ | — | 2 | 0.5 | 0.5 | 3 | 2 | 1 | 1 | — | 1 |
| | $SnO_2$ | 5 | 4 | 3 | 3 | — | — | — | — | 1 | — |
| | CaO | — | — | 2.5 | — | — | — | — | — | — | — |
| | MgO | — | — | 2.5 | 2.5 | — | — | — | — | — | — |
| | SrO | — | — | — | — | — | — | — | — | — | — |
| | PbO | — | — | — | 2.5 | — | — | — | — | — | — |
| | $La_2O_3$ | — | — | — | — | — | — | — | — | 2 | — |
| | $GeO_2$ | — | — | — | — | — | — | — | 25 | 15 | — |
| | $Sb_2O_3$ | — | — | — | — | — | — | — | — | 2 | — |
| | $Bi_2O_3$ | — | — | — | — | — | — | — | — | — | 6 |
| | $Ta_2O_5$ | — | — | — | — | — | — | — | — | — | — |
| Properties of glass | Yield point (°C.) | 678 | 568 | 656 | 682 | 530 | 605 | 650 | 547 | 617 | 592 |
| | Refractive index | 1.571 | 1.614 | 1.567 | 1.568 | 1.558 | 1.562 | 1.588 | 1.588 | 1.562 | 1.564 |

| | | Example 11 | Example 12 | Example 13 | Example 14 | Example 15 | Example 16 | Comp. Ex.1 | Comp. Ex.2 | Comp. Ex.3 | Comp. Ex.4 |
|---|---|---|---|---|---|---|---|---|---|---|---|
| Glass Composition | $SiO_2$ | 56 | 48 | 45 | 48.6 | 46.5 | 47.8 | 60 | 44 | 48.7 | 48.6 |
| | $B_2O_3$ | — | — | — | — | — | — | — | — | — | — |
| | $Al_2O_3$ | — | — | — | — | — | — | — | — | — | — |
| | $Li_2O$ | — | — | — | — | — | — | — | — | — | — |
| | $Na_2O$ | — | — | — | — | — | — | 20 | — | — | — |
| | $K_2O$ | 10 | 25 | 25 | 25 | 25 | 25 | — | 25 | 25 | 25 |
| | $Cs_2O$ | 10 | 10 | 10 | 10.1 | 10 | 10 | 10 | 10 | 10.1 | 10.1 |
| | BaO | — | — | 6 | — | — | — | — | — | — | — |
| | ZnO | 9 | 16 | 5 | 16.1 | 16 | 16 | 10 | 15 | 16.2 | 16.2 |
| | $ZrO_2$ | 1 | 1 | 1 | 0.2 | 1 | — | — | — | — | 0.1 |
| | $SnO_2$ | — | — | — | — | — | 0.2 | — | — | — | — |
| | CaO | — | — | — | — | — | — | — | — | — | — |
| | MgO | — | — | — | — | — | — | — | — | — | — |
| | SrO | — | — | — | — | 2.5 | — | — | — | — | — |
| | PbO | — | — | — | — | — | — | — | — | — | — |
| | $La_2O_3$ | — | — | — | — | — | — | — | — | — | — |
| | $GeO_2$ | — | — | — | — | — | — | — | — | — | — |
| | $Sb_2O_3$ | — | — | — | — | — | — | — | — | — | — |
| | $Bi_2O_3$ | 14 | — | — | — | — | — | — | — | — | — |
| | $Ta_2O_5$ | — | — | 8 | — | — | $As_2O_3$ 1 | — | 6 | — | — |
| Properties of glass | Yield point (°C.) | 597 | 623 | 654 | 622 | 620 | 620 | 500 | 645 | 622 | 622 |
| | Refractive | 1.559 | 1.562 | 1.560 | 1.562 | 1.566 | 1.559 | 1.521 | 1.566 | 1.561 | 1.562 |

TABLE 1-continued

| index |
| --- |

The following Examples 17 to 20 illustrate the production of light converging-type lenses from the cesium-containing optical glasses produced in the above Examples and Comparative Examples. These Examples also illustrate the superior properties of the cesium-containing optical glasses of this invention.

EXAMPLES 17 TO 20

(1) The glass of Comparative Example 1 was molded into a thin glass rod having a diameter of 1.1 mm, and dipped for about 200 hours in a bath of molten potassium nitrate at about 530° C. to perform an ion exchange reaction. There was obtained a light converging-type lens in which the content of cesium varied in the radial direction and thus, a refractive index distribution was provided in the same direction.

It was found that the light converging-type lens underwent marked corrosion at its surface by the free alkali generated by the heat decomposition of potassium nitrate during the 200 hours dipping operation in the molten potassium nitrate. A lens sample having a relatively good surface condition was chosen, and the difference in the refractive index ($\Delta n$) between its central part and its surface layer was measured, and found to be $37.0 \times 10^{-4}$.

Using the same bath of molten potassium nitrate, many glass rods were subjected to the ion-exchange treatment at the same temperature and for the same period of time as in the above procedure. During this treatment, exchange of the sodium ion in the glass with the potassium ion in the molten salt occurred simultaneously with the ion exchange of cesium in the glass with potassium in the molten salt. As a result, the amount of sodium in the molten salt gradually increased, and with it, the amount of sodium in the glass after ion exchange gradually increased. This is shown in FIG. 1 of the accompanying drawings. In FIG. 1, the abscissa represents the content (% by weight) of sodium in the molten potassium nitrate used and the ordinate, the content (% by weight) of remaining $Na_2O$ in the resulting light converging-type lens.

It was also found that when the content of sodium in the molten potassium nitrate increased, the treating time required to impart the desired properties became much longer. The same tendency was observed when the amount of the glass to be treated was increased. This state is shown in FIG. 2 of the accompanying drawings. In FIG. 2, the abscissa represents the amount of the glass dipped per kilogram of the molten potassium nitrate, and the ordinate, the time (hours) required until an equivalent performance was imparted at each amount dipped. The treating temperature was 530° C.

The above experimental facts suggest that in order to obtain a light converging-type lens having properties improved to any extent from glass having the composition of Comparative Example 1, the amount of the glass to be treated should be decreased as much as possible and the treatment should be completed within a short period of time. This, on the other hand, is likely to drastically reduce the productivity.

(2) The glass of Comparative Example 2 was molded into a thin glass rod having a diameter of 1.1 mm, and dipped in a bath of molten potassium nitrate at about 570° C. In about 120 hours, a light converging-type lens having the desired refractive index ($\Delta n = 37.9 \times 10^{-4}$) was obtained.

However, when the same bath of molten potassium nitrate was repeatedly used, decomposition of potassium nitrate took place gradually, and the resulting ion-exchanged glass rod became brittle because its surface was corroded to a white color. To obtain an ion-exchanged glass rod whose surface was not corroded to a white color, the molten potassium nitrate had to be exchanged with a new one after using it for 10 to 15 days. (This refers to the case of treating about 30 g of the glass rod per about one kilogram of the molten potassium nitrate, and means that the same bath needs to be replaced after it was used through two to three batches.)

(3) The glass of Example 12 was moled into a thin rod having a diameter of 1.1 mm, and dipped for about 120 hours in a bath of molten potassium nitrate at about 570° C. to perform an ion exchange reaction. There was obtained a light converging-type lens having a different cesium content in the radial direction and thereby forming a refractive index distribution in the same direction ($\Delta n = 38.0 \times 10^{-4}$ the glass of Example 12).

When the amount of these glasses to be treated was increased to 3 kg [this corresponds to 100 times the amount of glass of Comparative Example 1 treated (30 g)] per kilogram of potassium nitrate, light converging-type lenses of the desired properties could be obtained by dipping these glasses in the molten salt bath for about 120 hours.

Furthermore, it was found that when the molten potassium nitrate bath was repeatedly used at about 570° C. for about 6 months, the surfaces of the resulting light converging-type lenses were scarcely corroded.

Figure 3:
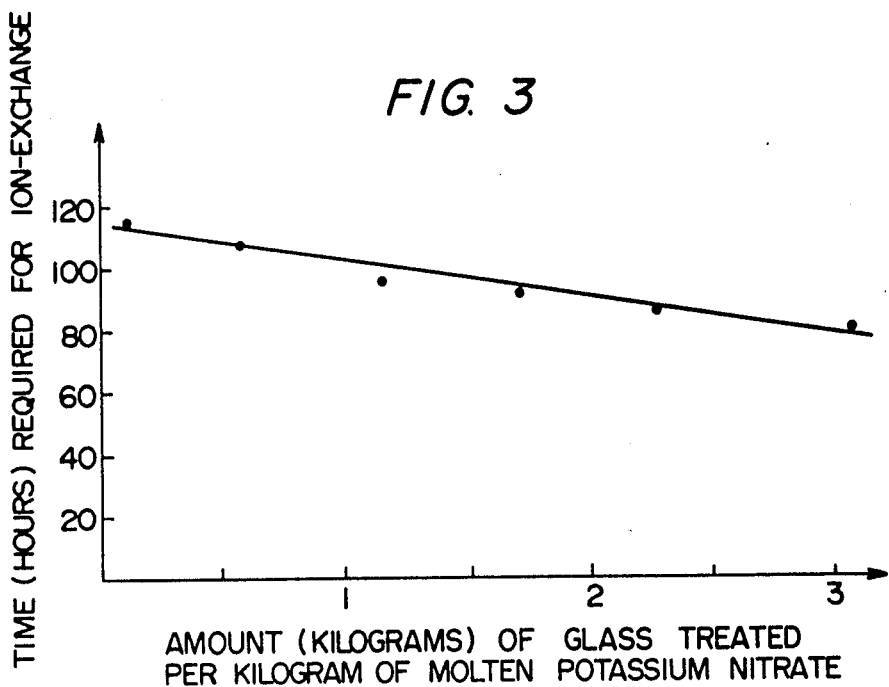
FIG. 3 is a graph which shows that when the amount of glass is increased in respect to the molten potassium nitrate, the ion-exchange treatment may be shortened.

A characteristic phenomenon was observed in the glass of Example 12 in that as shown in FIG. 3 (in which the abscissa represents the amount of glass to be treated per unit weight of the molten potassium nitrate, and the ordinate, the time required for ion exchanging), when the amount of the glass to be treated is increased, the ion exchanging time required can be shorter (compare with the glass of Comparative Example 1). The reason for this is not clear, however.

The glasses of Examples 1 to 16 were subjected to the same experiment as above. The experimental results show that the glass can be treated in a much larger amount per unit weight of potassium nitrate than the glass of Comparative Example 1, and as compared with the glass of Comparative Example 2, the frequency of exchange of the potassium nitrate bath can be much reduced, thus providing light converging-type lenses having the desired properties whose surfaces were scarcely corroded.

Upon comparing the compositions of the glasses in Examples 12 and 14 with those of the glasses in Comparative Examples 3 and 4, it follows that both are slightly different in the content of $ZrO_2$, but the light converging-type lenses produced from these glasses through the ion exchange are greatly different in the surface condition.

That is, in the light converging-type lenses produced from the glasses in Examples 12 and 14 and Comparative Examples 4 and 3, their surface roughnesses measured by scanning the surfaces thereof in the axial direction were 0.05 μm, 0.3 μm and 0.9 μm, respectively. The average surface roughness of at most 0.1 μm is a fully acceptable value as a light converging-type lens, but the surface roughness of at least 0.3 μm is too great to be acceptable.

The surface roughness was measured by Jaly-Surf 4-Model of Taylor-Hobson Company wherein a magnification of measuring a depth of concave and convex of the surface was 5000×.

The difference in refractive index (Δn) of some randomly chosen light converging-type lenses obtained from the glasses of Examples 1 to 16 was $108.9 \times 10^{-4}$, $60.9 \times 10^{-4}$, and $37.9 \times 10^{-4}$, respectively, for the glasses of Examples 1, 6 and 13.

Thus, the optical glass of this invention is of very high utilitarian value because it has very high corrosion resistance to potassium nitrate, and the amount of the glass to be treated per unit weight of potassium nitrate can be increased and yet the desired properties can be imparted by employing much the same treating time.

Using the glass of Example 12, an ion exchange was carried out in the same way as above, except that a mixture of potassium nitrate and potassium sulfate was used instead of potassium nitrate as the molten salt bath.

The temperature of the molten salt bath which was required to complete the ion exchange in about 120 hours was as shown in Table 2.

TABLE 2

| Bath composition (mole ratio) | | |
|---|---|---|
| $KNO_3$ | $K_2SO_4$ | Bath temperature (°C.) |
| 1 | 0 | about 570 |
| 1 | 0.09 | about 610 |
| 1 | 0.02 | about 620 |
| 1 | 0.25 | about 630 |

Glass fiber having different diameters was produced from the glass of Example 12, and the relation between the temperature of a molten potassium nitrate bath and the time required for ion exchange in the molten salt bath was determined. The results are shown in Table 3.

TABLE 3

| Bath temperature (°C.) | Diameter (mm) of the glass | | | | | |
|---|---|---|---|---|---|---|
| | 0.5 | 0.8 | 1.1 | 1.5 | 2.0 | 4.0 |
| 550 | 45 | 116 | 220 | 409 | 727 | — |
| 560 | 33 | 85 | 160 | 298 | 529 | 0 |
| 570 | 25 | 63 | 120 | 223 | 397 | 1590 |
| 580 | 19 | 50 | 94 | 175 | 311 | 1240 |
| 600 | 11 | 29 | 55 | 102 | 182 | 727 |
| 630 | 4 | 11 | 20 | 37 | 66 | 264 |

The resulting light converging-type lens was found to exhibit favorable performance at a bath temperature of 560° to 600° C.

In the light converging-type lens obtained from the cesium-containing optical glass of this invention by ion exchange, the concentration of cesium gradually decreases radially outwardly from its central axis, and instead the concentration of potassium gradually increases in the same direction. The refractive index of the lens gradually decreases in the same direction approximately proportional to the square of the distance.

We claim:

1. A cesium-containing optical glass consisting essentially of $SiO_2$, $K_2O$, $Cs_2O$, $ZnO$, at least one compound selected from the group consisting of $ZrO_2$ and $SnO_2$, and optionally at least one additional component selected from the group consisting of $BaO$, $GeO_2$, $La_2O_3$, $Sb_2O_3$, $Bi_2O_3$, $Al_2O_3$, $Ta_2O_5$, $Li_2O$, $Na_2O$, $CaO$, $MgO$, $SrO$, $PbO$, $B_2O_3$ and $As_2O_3$ in the following proportions in percent by weight:

| | |
|---|---|
| $SiO_2$ | 32–56 |
| $K_2O$ | 6–25 |
| $Cs_2O$ | 6–32 |
| $ZnO$ | 5–34 |
| $ZrO_2$ | 0–3 |
| $SnO_2$ | 0–5 |
| $BaO$ | 0–30 |
| $GeO_2$ | 0–25 |
| $La_2O_3$ | 0–2 |
| $Sb_2O_3$ | 0–2 |
| $Bi_2O_3$ | 0–14 |
| $Al_2O_3$ | 0–6 |
| $Ta_2O_5$ | 0–8 |
| $Li_2O$ | 0–2.5 |
| $Na_2O$ | 0–4.5 |
| $CaO$ | 0–2.5 |
| $MgO$ | 0–2.5 |
| $SrO$ | 0–2.5 |
| $PbO$ | 0–2.5 |
| $B_2O_3$ | 0–2 |
| $As_2O_3$ | 0–1 | provided that $BaO+MgO+ZnO=8-40$, $ZrO_2+SnO_2=0.2-6$, $Li_2O+Na_2O=0-7$ and $CaO+SrO+PbO=0-2.5$.

2. A cesium-containing optical glass of claim 1, wherein said additional component is selected from the group consisting of $BaO$, $GeO_2$, $La_2O_3$, $Sb_2O_3$, $Bi_2O_3$, $Al_2O_3$, $Ta_2O_5$, $Li_2O$, $Na_2O$, $CaO$, $MgO$, $PbO_2$ and $B_2O_3$, and said additional components is present in percent by weight defined in claim 1.

3. A light converging-type lens containing cesium in a gradually decreasing concentration outwardly from its central axis and potassium in a gradually increasing concentration in that direction, which is prepared by treating the cesium-containing optical glass of claim 1 in a molten salt bath containing potassium nitrate.

4. A light converging-type lens containing cesium in a gradually decreasing concentration outwardly from its central axis and potassium in a gradually increasing concentration in that direction, which is prepared by treating the cesium-containing optical glass of claim 2 in a molten salt bath containing potassium nitrate.

* * * * *